(12) United States Patent
Adams

(10) Patent No.: US 7,304,960 B2
(45) Date of Patent: Dec. 4, 2007

(54) METHODS AND SYSTEMS FOR PROVISIONING SONET ELEMENTS

(75) Inventor: Arthur V. Adams, Marietta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 1064 days.

(21) Appl. No.: 10/284,664

(22) Filed: Oct. 31, 2002

(65) Prior Publication Data

US 2004/0156319 A1 Aug. 12, 2004

(51) Int. Cl.
*H04L 12/28* (2006.01)

(52) U.S. Cl. ............... 370/255; 370/236.2; 370/252; 709/220; 709/223

(58) Field of Classification Search ........ 370/241–244, 370/254, 255, 907, 252, 236.2; 709/220, 709/221, 222, 223, 224, 225, 226
See application file for complete search history.

(56) References Cited

U.S. PATENT DOCUMENTS

| | | | | |
|---|---|---|---|---|
| 5,750,908 | A * | 5/1998 | Drohan | ............... 73/865.9 |
| 5,774,669 | A * | 6/1998 | George et al. | ............... 709/224 |
| 5,872,912 | A * | 2/1999 | Brownmiller et al. | ........ 714/47 |
| 5,884,310 | A * | 3/1999 | Brichta et al. | ............... 707/10 |
| 6,147,975 | A * | 11/2000 | Bowman-Amuah | ......... 370/252 |
| 6,236,365 | B1 * | 5/2001 | LeBlanc et al. | ............. 342/457 |
| 6,304,851 | B1 * | 10/2001 | Kmack et al. | ............... 705/11 |
| 7,099,580 | B1 * | 8/2006 | Bulbul | ......................... 398/9 |
| 2003/0086425 | A1 * | 5/2003 | Bearden et al. | ............. 370/392 |

* cited by examiner

*Primary Examiner*—Hassan Kizou
*Assistant Examiner*—Bo Hui A Zhu
(74) *Attorney, Agent, or Firm*—Scott P. Zimmerman, PLLC; Geoff Sutcliffe; Jodi Hartman

(57) ABSTRACT

Methods and systems are disclosed for provisioning a SONET network. One method acquires a SONET Capacity Activation report. The report contains information for telecommunications network equipment connected to the SONET network. A target identification number is generated for the telecommunications network equipment. The target identification number is then exported for provisioning of the SONET network.

20 Claims, 3 Drawing Sheets

METHODS AND SYSTEMS FOR PROVISIONING SONET ELEMENTS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computers and to telecommunications and, more particularly, to methods and systems for assigning circuits in a telecommunications network.

2. Description of the Related Art

A telecommunications network often has a network transport for the transmission of data. This network transport often comprises a Synchronous Optical Network (SONET) structure with redundant, multiple rings. As data is transported along the SONET, cross-connections between equipment connected along the SONET ("network elements" or "SONET elements") must be established so that data and voice traffic is correctly routed.

These circuit cross-connections are manually assigned. Once the individual pieces of equipment connected to the SONET have been inventoried, template records for each piece of equipment must be created. These templates help establish the required cross connections between SONET elements when routing data and voice traffic. The template records uniquely identify each SONET element. These template records, however, must be entered, or "built," in a manual environment. That is, the information that uniquely identifies each piece of equipment connected to the SONET is entered by hand into databases.

This manual environment is cumbersome. These template records are entered by hand, and then each record must be validated to ensure accuracy. Because there are many SONET elements along the network transport, there is a large amount of records to enter and to verify. These records, additionally, often dynamically change with changes in customer services. The accuracy of these records is then inherently limited by the usual constraints of any manual process: speed and accuracy. The sheer volume of records overwhelms a single person. If an entire group of persons is assigned to share responsibility for the records, the entire group's efficiency is reduced when each member must contribute to the entry and validation efforts. There is, accordingly, a need in the art for quickly, efficiently, and accurately provisioning telecommunications equipment connected along a Synchronous Optical Network.

BRIEF SUMMARY OF THE INVENTION

The aforementioned problems, and other problems, are reduced by an enhanced SONET provisioning program. This enhanced SONET provisioning program comprises computer programs and computer systems for managing the telecommunications equipment connected along a Synchronous Optical Network (SONET). This invention reduces the inherent limitations of the prior art manual process and, instead, automatically builds an accurate database of SONET element records. This invention refines each entry in the database to ensure compatibility with other computer programs and computer systems. This invention also performs further error-checking steps to ensure the database contains only valid entries for each SONET element. The database may then be shared with any other computer system or computer program. The SONET provisioning program of this invention thus provides faster and more accurate records and, thus, faster and more accurate circuit connections for voice, data, and video transmission. Because this invention permits faster and more accurate circuit connections, this invention, therefore, also improves customer satisfaction with their telecommunications service.

One aspect of this invention describes a method for provisioning a SONET network. A SONET Capacity Activation report is obtained, and the report contains information for telecommunications network equipment connected to the SONET network. A target identification number is generated for the telecommunications network equipment. The target identification number is then exported for provisioning of the SONET network.

Still another embodiment describes a computer system for provisioning a SONET network. The computer system includes a program stored in a memory device and used to provision telecommunications network equipment connected to the SONET network. The program obtains a SONET Capacity Activation report and generates a target identification number for export into an element communicator program. A processor communicates with the memory device.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein.

DETAILED DESCRIPTION OF THE INVENTION

Figure 1:
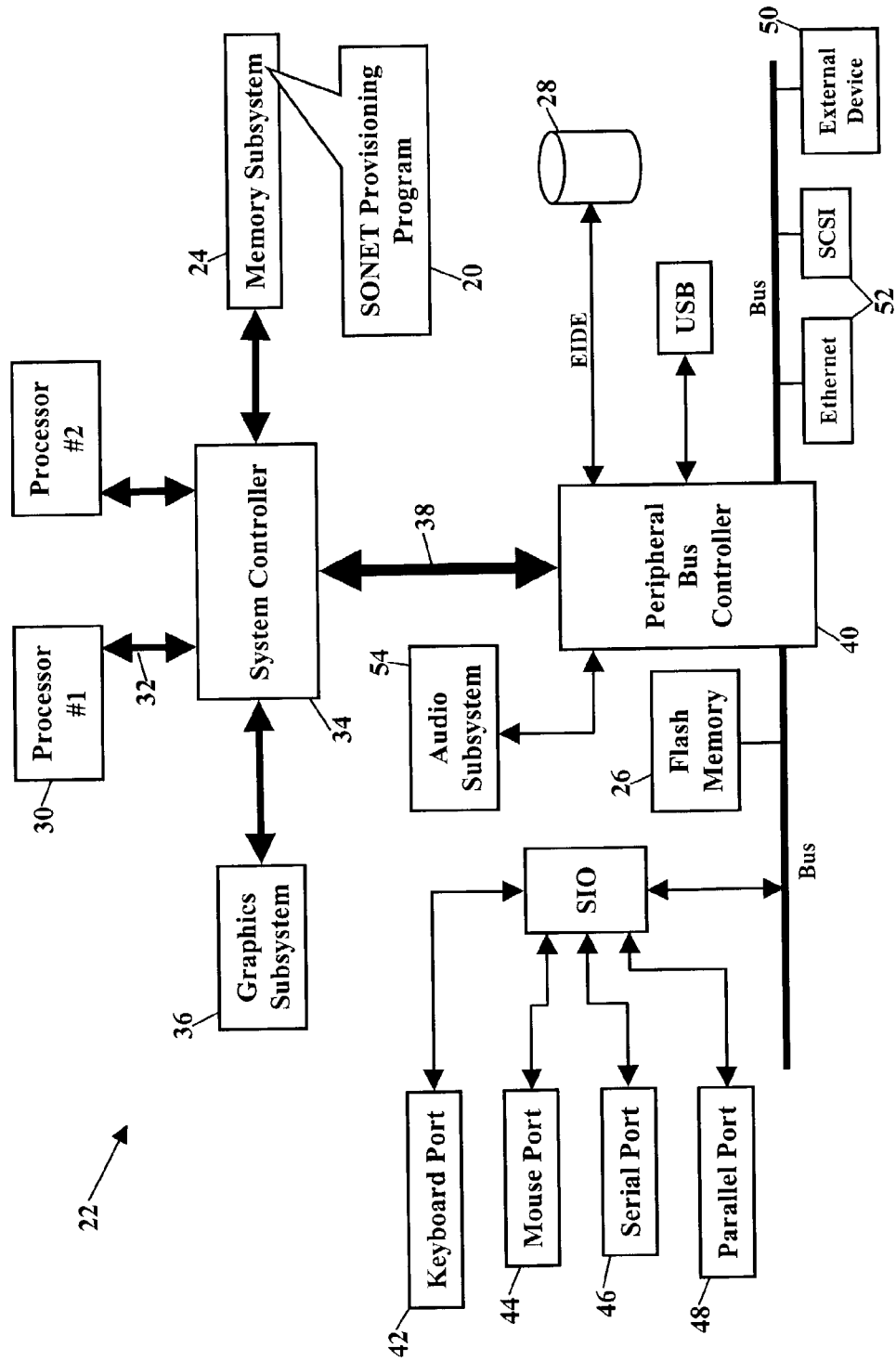
FIG. 1 is a block diagram showing one embodiment of the SONET provisioning program that resides in a computer system.

FIG. 1 depicts one possible operating environment for an embodiment of this invention. This embodiment of a SONET provisioning program 20 more quickly and more simply allows a user to provision network elements connected along a SONET network. Whereas the assignment of telecommunications circuits previously required slow and inaccurate manual processing, this invention provides a quick, accurate, and time-effective means of automating circuit assignments. This invention preferably uses a MICROSOFT® EXCEL® macro to process data from a SONET Capacity Activation system. The SONET provisioning program 20 imports the raw data from the SONET Capacity Activation system and quickly processes and refines this data into an accurate MICROSOFT® EXCEL® spreadsheet. The spreadsheet may then be manipulated and presented to any format or requirement. The data in the spreadsheet is then exported to other computer systems for use in assigning telecommunications circuits.

FIG. 1 is a block diagram showing the SONET provisioning program 20 residing in a computer system 22. The SONET provisioning program 20 operates within a system memory device. The SONET provisioning program 20, for example, is shown residing in a memory subsystem 24. The SONET provisioning program 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

The central processor 30 is typically a microprocessor. Advanced Micro Devices, Inc., for example, manufactures a full line of microprocessors, such as the ATHLON™ (ATHLON™ is a trademark of Advanced Micro Devices, Inc., One AMD Place, P.O. Box 3453, Sunnyvale, Calif. 94088-3453, 408.732.2400, 800.538.8450). Sun Microsystems also designs and manufactures microprocessors (Sun Microsystems, Inc., 901 San Antonio Road, Palo Alto Calif. 94303). The Intel Corporation manufactures microprocessors (Intel Corporation, 2200 Mission College Blvd., Santa Clara, Calif. 95052-8119, 408.765.8080). Other manufacturers also offer microprocessors. Such other manufacturers include Motorola, Inc. (1303 East Algonquin Road, P.O. Box A3309 Schaumburg, Ill. 60196), International Business Machines Corp. (New Orchard Road, Armonk, N.Y. 10504, (914) 499-1900), and Transmeta Corp. (3940 Freedom Circle, Santa Clara, Calif. 95054). Those skilled in the art further understand that the program, processes, methods, and systems described in this patent are not limited to any particular manufacturer's central processor.

The preferred operating system is a DOS-based system. WINDOWS® and WINDOWS NT® are common examples of DOS-based systems (WINDOWS® and WINDOWS NT® are registered trademarks of Microsoft Corporation, One Microsoft Way, Redmond Wash. 98052-6399, 425.882.8080). Other operating systems, however, are also suitable. Such other operating systems would include a UNIX®-based system (UNIX® is a registered trademark of The Open Group, 44 Montgomery Street, Suite 960, San Francisco, Calif. 94104, 415.374.8280), and Mac® OS (Mac® is a registered trademark of Apple Computer, Inc., 1 Infinite Loop, Cupertino, Calif. 95014, 408.996.1010). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

Figure 2:
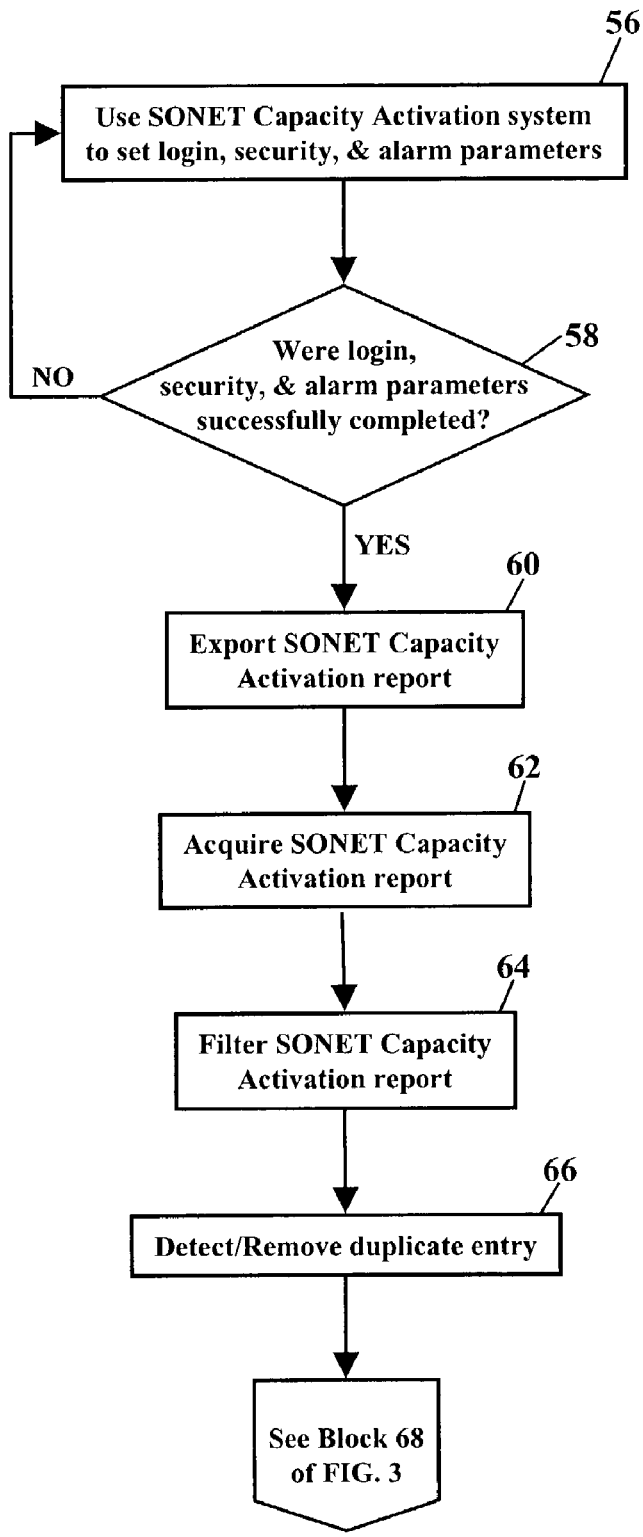
FIGS. 2 and 3 are flowcharts showing one method for provisioning a SONET network.
Figure 3:
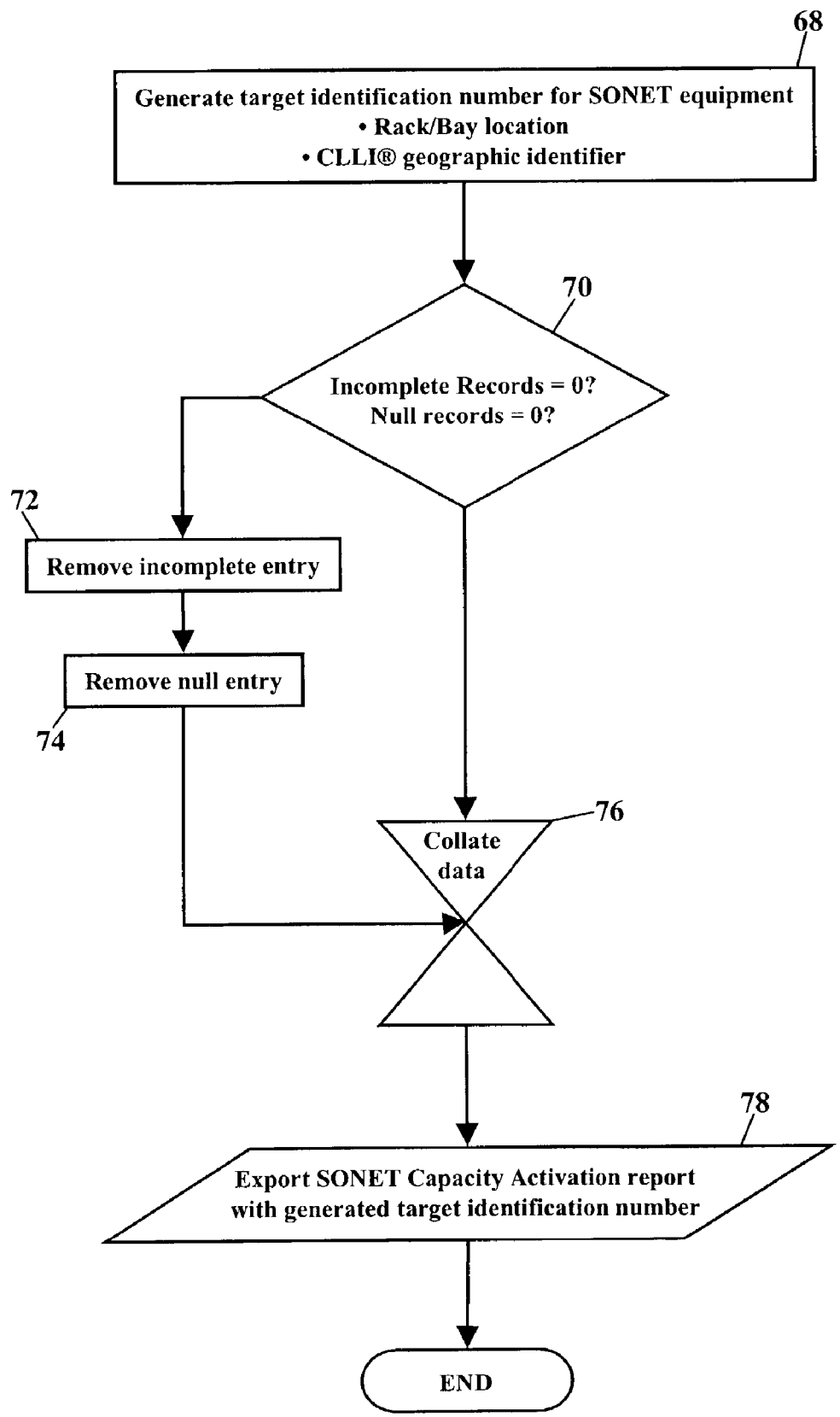

FIGS. 2 and 3 are flowcharts showing one method for provisioning a SONET network. A SONET Capacity Activation system is used to set security and login privileges for the telecommunications network equipment connected to the SONET network (Block 56). The SONET Capacity Activation system is also used to establish any parameters for alarm monitoring of the telecommunications network equipment connected to the SONET network. The method then checks to ensure the security, login, and alarming parameters are successfully completed (Block 58). If the security, login, and alarming parameters are successfully completed, then remote communication with each SONET network equipment (or SONET "element") is correctly established.

The term "provisioning" means assigning bandwidth within the fiber. Optical fiber provides data capacity between SONET network elements in a ring configuration, and options must be set to ensure a stable ring. Circuit provisioning, however, is needed to assign a discrete bandwidth to each circuit within the fibers. This circuit "provisioning" is known as subdividing the optical fiber's bandwidth into many virtual circuits. Generally speaking, optical carrier signals must be synchronized with standards, such as DS1 and DS3, to which the signals are connecting. "Provisioning" has three (3) parts:

selecting and provisioning the high-speed timeslot around the ring;

selecting and provisioning the high-speed "cross-connect" drop assignment to the low speed multiplexer—a dropping to the circuit pack level; and provisioning the hardware options on the circuit pack to match the local equipment at the endpoints.

Provisioning the SONET circuits on a network element may be accomplished either locally or remotely. Local provisioning is accomplished at the network element, in which case the person provisioning at one network element may provision the circuit around the entire ring. Remote provisioning, however, is accomplished over a data network—usually via x.25—in which case the person provisioning may access the gateway network element to provision the ring in the same manner.

A SONET Capacity Activation report is then exported (Block 60). The SONET Capacity Activation report is an electronic data file. The SONET Capacity Activation report contains a status report produced by the SONET Capacity Activation system. The SONET Capacity Activation report contains specific information for each SONET network equipment (or SONET "element"). The SONET Capacity Activation report, for example, contains an event history for each SONET element. Because each SONET element has a unique identification, this event history can be sorted and/or arranged. The SONET Capacity Activation report, for example, can be sorted and/or arranged by date(s), by event type, and/or by a person's user identification. The SONET Capacity Activation report may also contain a system target identification, software release, equipment model type, and equipment model name for each SONET element. The SONET Capacity Activation report can be saved in many formats, but the SONET Capacity Activation report is preferably saved as a comma-separated values (.csv) text file. The SONET Capacity Activation system then makes the SONET Capacity Activation report available for export to other programs.

This invention acquires the SONET Capacity Activation report (Block 62). The SONET Capacity Activation report can be acquired by importation, download, file transfer, or any other means of obtaining possession of the electronic data file that is the SONET Capacity Activation report. The SONET Capacity Activation report is preferably imported into a MICROSOFT® EXCEL® workbook as a comma-separated value (.csv) text file (MICROSOFT® and EXCEL® are registered trademarks of Microsoft Corporation, One Microsoft Way, Redmond Wash. 98052-6399, 425.882.8080). Because the SONET Capacity Activation report is preferably imported into a MICROSOFT® EXCEL® workbook, the SONET Capacity Activation report is paginated and labels are assigned to each data range.

The SONET Capacity Activation report is then filtered (Block 64). While the SONET Capacity Activation report can be filtered based upon any criteria, this invention preferably filters based upon a technician's User Identification (or "UserID"). The SONET Capacity Activation report, for example, is filtered based upon the Common UserID ("CUID") of the technicians in a Capacity Activation group. Many different groups may utilize the SONET Capacity Activation report, so the results are filtered to reduce non-relevant data from other groups. This invention could also filter or sort the SONET Capacity Activation report for a specific event, a range of events, and groupings of technicians or other people. This invention could also filter or sort the SONET Capacity Activation report for one or more events occurring on a single day or one or more events occurring on multiple days.

The SONET Capacity Activation report may have duplicate entries. There are many reasons why duplicate entries appear in the SONET Capacity Activation report. For example, some events automatically occur (such as equipment resets) and, thus, do not correlate to a UserID. These duplicate entries are detected and removed as an error-checking step (Block 66).

The flowchart continues with FIG. 3. A target identification number is then generated for the telecommunications network equipment (Block 68). This target identification number is referred to as an "upstream target identification" or "upstream TID." As paragraph [0016] discusses, the SONET Capacity Activation system assigns a unique system target identification number for each SONET element. The SONET Capacity Activation system will not export this unique system target identification number as a data field in the SONET Capacity Activation report. A target identification number, however, is required to address each SONET element. This invention, then, generates an upstream target identification number (or "upstream TID") for each SONET element. This upstream target identification number may be generated from an actual physical location of the SONET element. Each SONET element, for example, is located in the field at a particular rack and bay location. As those of ordinary skill understand, the SONET equipment is stored in a rack, and each rack has one or more bays. Each rack location and each bay location has an identifying number, so the target identification number may be generated using the rack and bay location for each SONET element.

The target identification number may also be generated using COMMON LANGUAGE® location codes for the telecommunications network equipment (Block 68). As those of ordinary skill in the art of telecommunications recognize, a COMMON LANGUAGE® location code (typically referred to as CLLI®) is an eleven (11) character standardized geographic identifier (COMMON LANGUAGE® and CLLI® are registered trademarks of Telcordia Technologies, 445 South Street, Morristown, N.J. 07960-6438, 973.829.2000). The COMMON LANGUAGE® location code uniquely identifies the geographic location of places and certain functional categories of equipment unique to the telecommunications industry. The COMMON LANGUAGE® location codes are used to ensure uniform abbreviations for equipment, facility, and location names. Because each SONET element can be uniquely identified using COMMON LANGUAGE®, the target identification number may also be generated using COMMON LANGUAGE® location codes.

Once the target identification number is generated, the filtered and refined SONET Capacity Activation report is prepared for export. The filtered and refined SONET Capacity Activation report records are checked for incomplete and null entries (Block 70). Any incomplete entry (Block 72), and any null entry (Block 74), is removed. The refined SONET Capacity Activation report may then be collated (Block 76) into any preferred format or presentation. The refined SONET Capacity Activation report, for example, must have a required arrangement when exported to some other programs and systems. The refined SONET Capacity Activation report, therefore, is collated to arrange the data records in any required format. Once these preparational steps are completed, the filtered and refined SONET Capacity Activation report, with the generated target identification number, is then exported for provisioning of the SONET network (Block 78).

The refined data records are preferably exported to an element communicator ("ELCOM") program. Because the SONET Capacity Activation report was preferably imported into a MICROSOFT® EXCEL® workbook, the refined data records are preferably saved as a comma-separated values (.csv) text file. This electronic text file is then exported to an element communicator ("ELCOM") program. As those of ordinary skill in the art of telecommunications recognize, an element communicator program manages communications between the SONET elements and a telecommunications service provider's operations support system (or "OSS"). One such element communicator is the TELCORDIA® Element Communicator product (TELCORDIA® is a registered trademark of Telcordia Technologies, 445 South Street, Morristown, N.J. 07960-6438, 973.829.2000). These refined data records are uploaded in a bulk process to provide telemetry assignments for the SONET elements.

The refined SONET Capacity Activation data records may also be exported to other programs and computer systems. For example, the refined SONET Capacity Activation report records may be exported to the TELCORDIA® Transport Element Activation Manager program. As those of ordinary skill in the art of telecommunications recognize, the TELCORDIA® Transport Element Activation Manager provides automated remote provisioning, administration, and restoration of the SONET elements. The refined SONET Capacity Activation data records, of course, may be formatted in any file format and then exported to any program or computer system.

This invention is particularly useful when managing the SONET network. Because the SONET Capacity Activation report was preferably imported into a MICROSOFT® EXCEL® workbook, the refined data records can be presented in a variety of formats and charts. As those of ordinary skill in the art of computing understand, the refined data records can be processed by MICROSOFT® EXCEL® into visually simple and useful charts and diagrams. These charts and diagrams may then be used to manage the SONET elements and to warehouse data. The methods of this invention can also be transformed into a MICROSOFT® EXCEL® add-in for use in other MICROSOFT® products, applications, and environments.

The SONET provisioning program (shown as reference numeral 20 in FIG. 1), including the methods of the present invention, may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-users, licensees, and assignees. These types of computer-readable media, and other types not mention here but considered within the scope of this invention, allow the SONET provisioning program to be easily disseminated. A computer program product, for provisioning a SONET network, acquires a SONET Capacity Activation report. The report contains information for telecommunications network equipment connected to the SONET network. A target identification number is generated for the telecommunications network equipment. This target identification number is then exported for provisioning of the SONET network.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
    acquiring a SONET Capacity Activation report comprising status information for each SONET element connected to a SONET network, the SONET Capacity Activation report failing to export a unique system target identification number for each SONET element;
    generating an upstream target identification number for each SONET element, the upstream target identification number describing a corresponding rack and bay physical location of each SONET element;
    refining the SONET Capacity Activation report to include the upstream target identification number for each SONET element; and
    exporting the refined SONET Capacity Activation report for provisioning of the SONET network.

2. A method according to claim 1, further comprising filtering the refined SONET Capacity Activation report based upon a technician's User Identification.

3. A method according to claim 1, further comprising detecting a duplicate entry in the refined SONET Capacity Activation report.

4. A method according to claim 1, further comprising removing a duplicate entry in the refined SONET Capacity Activation report.

5. A method according to claim 1, further comprising removing an incomplete entry in the refined SONET Capacity Activation report.

6. A method according to claim 1, further comprising removing a null entry in the refined SONET Capacity Activation report.

7. A method according to claim 1, further comprising collating the refined SONET Capacity Activation report.

8. A method according to claim 1, wherein generating the upstream target identification number comprises generating the target identification number using a standardized location code that uniquely identifies a geographic location of each SONET element.

9. A method according to claim 1, further comprising sorting the refined SONET Capacity Activation report according to an event.

10. A method according to claim 1, further comprising sorting the refined SONET Capacity Activation report according to a range of events.

11. A method according to claim 1, wherein acquiring the SONET Capacity Activation report comprises acquiring the SONET Capacity Activation report in a comma-separated values format.

12. A method according to claim 1, wherein exporting the refined SONET Capacity Activation report comprises exporting the refined SONET Capacity Activation report in a comma-separated values format.

13. A method according to claim 1, wherein exporting the refined SONET Capacity Activation report comprises exporting the refined SONET Capacity Activation report to an element communicator program.

14. A system for provisioning a SONET network, the system operative to:
    acquire a SONET Capacity Activation report comprising status information for each SONET element connected to a SONET network, the SONET Capacity Activation report failing to export a unique system target identification number for each SONET element;
    generate an upstream target identification number for each SONET element, the upstream target identification number describing a corresponding rack and bay physical location of each SONET element;
    refine the SONET Capacity Activation report to include the upstream target identification number for each SONET element; and
    export the refined SONET Capacity Activation report for provisioning of the SONET network.

15. A system according to claim 14, further operative to filter the refined SONET Capacity Activation report based upon a technician's User Identification.

16. A system according to claim 14, further operative to remove a duplicate entry in the refined SONET Capacity Activation report.

17. A system according to claim 14, further operative to remove an incomplete entry in the refined SONET Capacity Activation report.

18. A system according to claim 14, further operative to generate the upstream target identification number using a standardized location code that uniquely identifies a geographic location of each SONET element.

19. A system according to claim 14, further operative to sort the refined SONET Capacity Activation report according to an event.

20. A system according to claim 14, further operative to sort the refined SONET Capacity Activation report according to a range of events.

* * * * *